Nov. 20, 1923.	1,474,728
R. H. NELSON
BASKET CARRIER
Original Filed Jan. 13, 1921
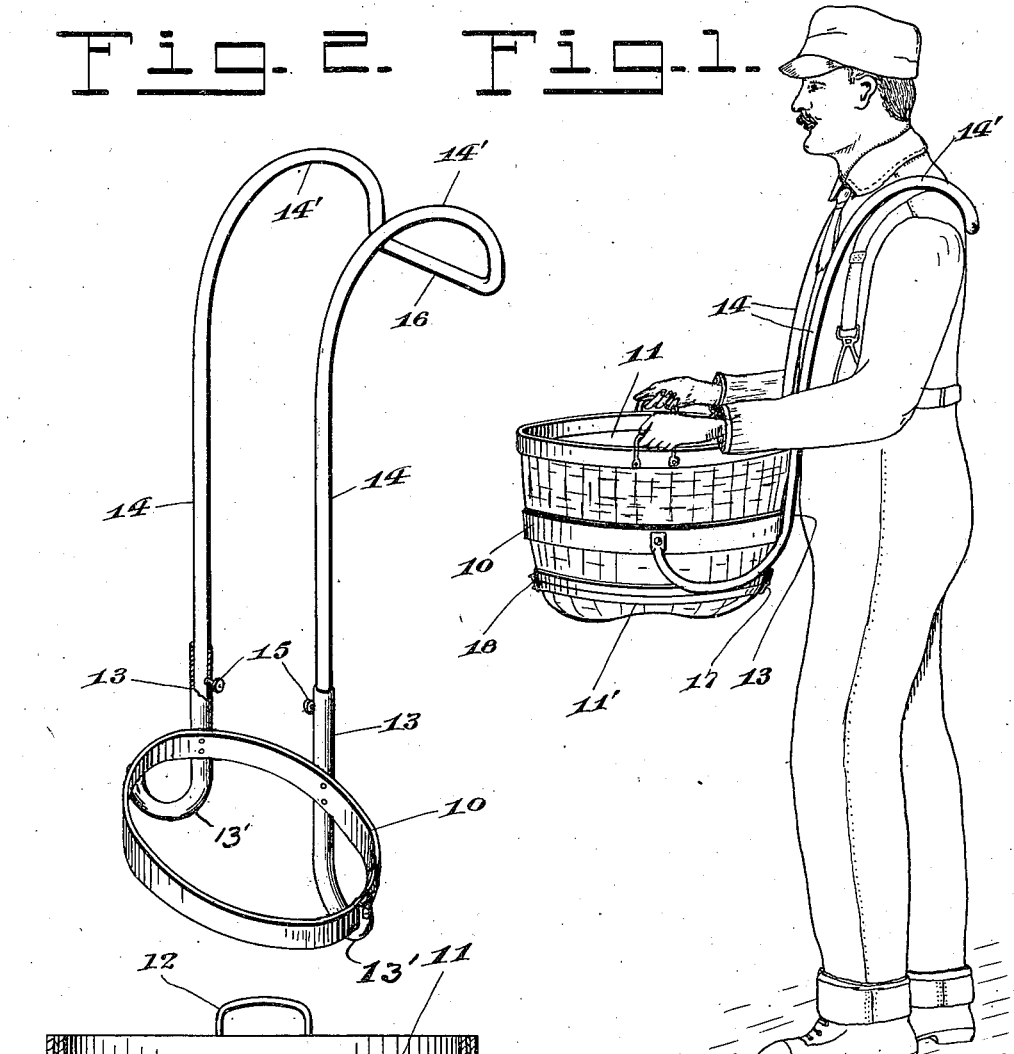
INVENTOR:
Rose H. Nelson.
BY
Chandler & Chandler
ATTORNEYS Patented Nov. 20, 1923.

1,474,728

UNITED STATES PATENT OFFICE.

ROSE H. NELSON, OF WESSINGTON SPRINGS, SOUTH DAKOTA.

BASKET CARRIER.

Application filed January 13, 1921, Serial No. 436,903. Renewed August 4, 1923.

*To all whom it may concern:*

Be it known that I, ROSE H. NELSON, a citizen of the United States, residing at Wessington Springs, in the county of Jerauld, State of South Dakota, have invented certain new and useful Improvements in Basket Carriers; and I do hereby declare the following to be a full, clear, and exact description of the invention, such as will enable others skilled in the art to which it appertains to make and use the same.

This invention relates to new and useful improvements in carriers and particularly to carriers for carrying baskets.

One object of the invention is to provide a carrier by means of which a basket may be easily and comfortably supported on the shoulders of a person.

Another object is to provide a carrier which is adjustable so as to dispose the basket at the desired position in front of the person carrying the same.

Another object is to provide a device of this character from which the basket can be readily removed and another placed therein.

A further object is to provide a basket, associated with the novel form of carrier, by means of which the contents may be readily and quickly dumped without removing the basket from the carrier.

Other objects and advantages will be apparent from the following description when taken in connection with the accompanying drawing.

In the drawing:

Figure 1 is a perspective view of the carrier and basket suspended from the shoulders of a person.

Figure 2 is a perspective view of the carrier.

Figure 3 is an enlarged vertical section through the basket showing the hinged bottom.

Referring particularly to the accompanying drawing 10 represents a horizontal ring into which the basket 11 is slipped, said ring being of a diameter slightly less than the diameter of the basket at the handles 12, so that the basket will not pass entirely through the ring. Secured to the ring, and extending upwardly in parallel relation, are the tubular members 13, and telescoped into the upper ends of these members are the lower reduced ends of the members 14 which may be held in their different adjusted positions within the members 13 by means of the screws 15. The upper ends of the members 14 are connected by a bight portion 16 and said members are curved at the points of connection with the bight portion, as shown at 14', to form a hook which engages over the shoulders of the person, the head of the person being passed through the space between the members 14, as shown in Figure 1.

The lower ends of the members 13 are formed with the bowed portions 13' which are connected with the sides of the ring 10. These portions 13', when the basket is supported in the ring 10, lie at the sides of the lower portion of the basket 11.

By this construction the greater part of the weight of the filled basket will be supported on the shoulders of the person, the person grasping the handles of the basket to hold the basket against movement, as well as to partially support the weight. When the basket has been carried to the point of discharge, the basket is removed from the ring and the same dumped, after which the empty basket is carried back for reloading. In the event it is not desired to remove the basket for the purpose of dumping its contents, I provide the basket with a hinged bottom 11', connected to the basket by the hinge 17, at one side, and detachably held at the other side of the basket by the hood 18, which engages with a loop on the basket. Thus, by releasing the hook from the loop, the weight of the contents of the basket will cause the bottom to swing down and dump the contents.

What is claimed is:

A basket carrier comprising a ring in which a basket is adapted to be supported, vertical parallel members secured to one side of the ring and having screws therein, a pair of vertical members telescoped into the first members and held in adjusted positions by said screws, the upper ends of the second-named vertical members having a curved shoulder engaging bight portion, and a basket having a releasably hinged bottom.

In testimony whereof, I affix my signature, in the presence of two witnesses.

ROSE H. NELSON.

Witnesses:
 MRS. MILO PUTNEY,
 M. M. McDOUALL.